United States Patent
Chen et al.

(10) Patent No.: US 11,429,193 B2
(45) Date of Patent: Aug. 30, 2022

(54) CONTROL OF VIRTUAL OBJECTS BASED ON GESTURE CHANGES OF USERS

(71) Applicant: BEIJING SENSETIME TECHNOLOGY DEVELOPMENT CO., LTD., Beijing (CN)

(72) Inventors: Kaijia Chen, Beijing (CN); Yurou Lu, Beijing (CN); Kun Qian, Beijing (CN); Yakui Dong, Beijing (CN); Binxu Peng, Beijing (CN); Yibao Zhang, Beijing (CN); Zhixing Yu, Beijing (CN); Wei Yuan, Beijing (CN)

(73) Assignee: BEIJING SENSETIME TECHNOLOGY DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 17/083,436

(22) Filed: Oct. 29, 2020

(65) Prior Publication Data
US 2021/0041957 A1 Feb. 11, 2021

Related U.S. Application Data

(63) Continuation of application No. PCT/CN2019/128805, filed on Dec. 26, 2019.

(30) Foreign Application Priority Data

Feb. 1, 2019 (CN) .......................... 201910102773.3

(51) Int. Cl.
*G06F 3/01* (2006.01)
*G06T 7/73* (2017.01)
(Continued)

(52) U.S. Cl.
CPC .............. *G06F 3/017* (2013.01); *G06F 3/011* (2013.01); *G06T 7/60* (2013.01); *G06T 7/73* (2017.01);
(Continued)

(58) Field of Classification Search
CPC ............ G06K 9/00335; G06K 9/00228; G06F 3/0304; G06F 3/011; G06F 3/017;
(Continued)

(56) References Cited

U.S. PATENT DOCUMENTS

2013/0307766 A1* 11/2013 Amathnadu ....... G06K 9/00355
345/156
2014/0282278 A1* 9/2014 Anderson ........... G06F 3/04883
715/863
(Continued)

FOREIGN PATENT DOCUMENTS

CN 102103408 A 6/2011
CN 102129343 A 7/2011
(Continued)

OTHER PUBLICATIONS

First Office Action of the Chinese application No. 201910102773.3, dated May 14, 2021, 21 pgs.
(Continued)

*Primary Examiner* — Abbas I Abdulselam
(74) *Attorney, Agent, or Firm* — Cooper Legal Group, LLC

(57) ABSTRACT

A method and apparatus for controlling a virtual object, a terminal, and a storage medium are disclosed. The method includes: acquiring a plurality of images of a user; determining, according to the plurality of images acquired, a gesture change parameter of a gesture change of the user; and controlling, according to the gesture change parameter, a virtual object corresponding to the user.

20 Claims, 13 Drawing Sheets

(51) Int. Cl.
  *G06T 7/60* (2017.01)
  *G06V 40/10* (2022.01)
  *G06V 40/20* (2022.01)
  *G06V 40/16* (2022.01)
  *A63F 13/213* (2014.01)
(52) U.S. Cl.
  CPC ............ *G06V 40/10* (2022.01); *G06V 40/161* (2022.01); *G06V 40/20* (2022.01); *A63F 13/213* (2014.09); *A63F 2300/1087* (2013.01); *G06T 2207/30201* (2013.01)
(58) Field of Classification Search
  CPC ............. G06T 7/73; G06T 2207/30201; A63F 13/428; A63F 13/22; A63F 13/816; A63F 2300/1087; A63F 13/213; G06V 40/20
  See application file for complete search history.

(56) References Cited

U.S. PATENT DOCUMENTS

| | | | | |
|---|---|---|---|---|
| 2017/0287222 | A1* | 10/2017 | Fujimaki | G06T 19/006 |
| 2018/0063397 | A1 | 3/2018 | Sudou et al. | |
| 2019/0213314 | A1* | 7/2019 | Gordon | G06F 21/316 |
| 2019/0266807 | A1* | 8/2019 | Lee | G06T 11/001 |
| 2020/0097070 | A1* | 3/2020 | Chen | G06K 9/00342 |
| 2021/0160150 | A1* | 5/2021 | Taki | G06F 3/0484 |

FOREIGN PATENT DOCUMENTS

| | | |
|---|---|---|
| CN | 102395411 A | 3/2012 |
| CN | 102414641 A | 4/2012 |
| CN | 102449577 A | 5/2012 |
| CN | 102749990 A | 10/2012 |
| CN | 103020885 A | 4/2013 |
| CN | 103207667 A | 7/2013 |
| CN | 104036488 A | 9/2014 |
| CN | 107831902 A | 3/2018 |
| CN | 108090463 A | 5/2018 |
| CN | 108905198 A | 11/2018 |
| CN | 109091869 A | 12/2018 |
| CN | 109126126 A | 1/2019 |
| CN | 109241810 A | 1/2019 |
| EP | 1954050 A2 | 8/2008 |
| EP | 2497546 A2 | 9/2012 |
| JP | 2007179338 A | 7/2007 |
| JP | 2011194073 A | 10/2011 |
| JP | 2012221023 A | 11/2012 |
| JP | 2013507688 A | 3/2013 |
| TW | 201726216 A | 8/2017 |
| WO | 2016136838 A1 | 9/2016 |
| WO | 2018089852 A1 | 5/2018 |

OTHER PUBLICATIONS

International Search Report in the international application No. PCT/CN2019/128805, dated Mar. 27, 2020, 2 pgs.
First Office Action of the Japanese application No. 2020-560769, dated Nov. 24, 2021, 9 pgs.
English translation of the Written Opinion of the International Search Authority in the international application No. PCT/CN2019/128805, dated Mar. 27, 2020, 4 pgs.

* cited by examiner

# CONTROL OF VIRTUAL OBJECTS BASED ON GESTURE CHANGES OF USERS

CROSS-REFERENCE TO RELATED APPLICATIONS

This application is a continuation of International Application No. PCT/CN2019/128805, filed on Dec. 26, 2019, which claims priority to Chinese patent application No. 201910102773.3, filed on Feb. 1, 2019. The contents of International Application No. PCT/CN2019/128805 and Chinese patent application No. 201910102773.3 are hereby incorporated by reference in their entireties.

TECHNICAL FIELD

The disclosure relates to image processing technologies, and more particularly, to control of a virtual object according to a gesture change of a user.

BACKGROUND

Users may use mobile phones, tablet computers, wearable devices, smart TVs or other electronic devices to play games. In order to facilitate users controlling games, somatosensory games have appeared. The somatosensory games generally require users to wear somatosensory devices, so as to control the games through body movements of the users. During the games, virtual characters played by the users will be controlled. For example, body movements of the users are sensed by the somatosensory devices, so as to control actions of virtual objects corresponding to the users.

SUMMARY

In view of this, a method for controlling a virtual object, a terminal, and a storage medium are provided in embodiments of the disclosure.

According to an aspect of the disclosure, provided is a method for controlling a virtual object, including: acquiring a plurality of images of a user; determining, according to the plurality of images, a gesture change parameter of a body gesture change of the user; and controlling, according to the gesture change parameter, a virtual object corresponding to the user.

According to another aspect of the disclosure, provided is an apparatus for controlling a virtual object, including: an acquisition module, configured to acquire a plurality of images of a user; a determination module, configured to determine, according to the plurality of images, a gesture change parameter of a gesture change of the user; and; and a control module, configured to control, according to the gesture change parameter, a virtual object corresponding to the user.

According to another aspect of the disclosure, provided is an apparatus for controlling a virtual object, including: a processor; and a memory configured to store instructions which, when being executed by the processor, cause the processor to carry out the following: acquiring a plurality of images of a user; determining, according to the plurality of images, a gesture change parameter of a gesture change of the user; and controlling, according to the gesture change parameter, a virtual object corresponding to the user.

According to yet another aspect of the disclosure, provided is a non-transitory computer-readable storage medium having stored thereon computer programs that, when being executed by a computer, cause the computer to carry out the following: acquiring a plurality of images of a user; determining, according to the plurality of images, a gesture change parameter of a gesture change of the user; and controlling, according to the gesture change parameter, a virtual object corresponding to the user.

In the technical solutions provided in the embodiments of the disclosure, images are acquired, a gesture change parameter of a gesture change of a user is obtained based on the images, and a virtual object corresponding to the user is controlled using the gesture change parameter. In this way, the virtual object corresponding to the user may be controlled using the detected gesture of the user, and there is no need to use special somatosensory devices, thereby reducing investment in hardware.

DETAILED DESCRIPTION

The technical solutions of the disclosure are further described below in detail in combination with the accompanying drawings and particular embodiments of the disclosure.

Figure 1:
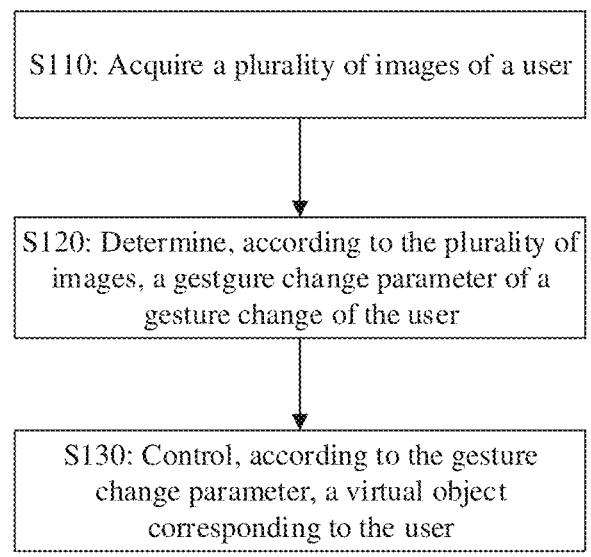
FIG. 1 illustrates a schematic flowchart of a first method for controlling a virtual object according to an embodiment of the disclosure.

As illustrated in FIG. 1, a method for controlling a virtual object is provided in embodiments of the disclosure. The method includes the following operations. In operation S110, a plurality of images are acquired for a user. In operation S120, a gesture change parameter of a gesture change of the user is determined according to the plurality of images. In operation S130, a virtual object corresponding to the user is controlled according to the gesture change parameter.

The method for controlling a virtual object provided in embodiments of the disclosure may be applied to a terminal, and the terminal may be a game terminal, or a large-scale electronic device such as a smart TV or an advertising device. In the following, the method for controlling a virtual object will be described with a terminal being a game terminal and a virtual object being a game character as an example.

The terminal includes, or is connected to, an image acquisition module, which is capable of acquiring images of a user. Imaging of the user is contained in the acquired image.

The image acquired in operation S110 may be a two-dimensional (2D) image and/or a three-dimensional (3D) image. The 2D image may be a planar red green blue (RGB) image or a YUV image. The 3D image may include: a 2D image and a depth image corresponding to the 2D image. A pixel value in the depth image is a depth value representing a distance between the user and the image acquisition module.

If the image is a 2D image, a gesture change of the user in a two-dimensional (2D) plane may be determined according to the 2D image. If the image is a 3D image, a gesture change of the user in a three-dimensional (3D) space may be obtained according to the 2D image and the depth image that are contained in the 3D image.

In operation S120, the gesture change of the user is determined according to the acquired image. In embodiments of the disclosure, the gesture change includes at least, but not limited to, a gesture change of a trunk. In some other embodiments, the gesture change may include at least a gesture change of a lower limb.

In embodiments of the disclosure, the gesture change parameter may be various parameters indicating the gesture change of the user, for example, a parameter indicating the gesture change of the trunk, and/or a parameter indicating the gesture change of the lower limb.

In some embodiments, divided according to different dimensions, the gesture change parameter includes one or more of the following: a time parameter of a gesture change, an amplitude parameter of the gesture change, a direction parameter of the gesture change, and a frequency parameter of the gesture change.

In some embodiments, one of the gesture change parameters may be used to control the game character in one control dimension. In some other embodiments, a plurality of the gesture change parameters together may be used to control the game character in one control dimension.

In embodiments of the disclosure, in operation S130, the game character corresponding to the user is controlled according to the gesture change parameter.

The operation S130 may include one or more of: movement of the game character in a game scene is controlled; an expression change of the game character is controlled; the change in a costume and/or a prop of the game character is controlled; or the gesture change of the game character is controlled.

In embodiments of the disclosure, the game may be a jump game, and the game character is a jumper in the jump game. In this case, the operation S130 may include: a jump of the game character is controlled according to the gesture change parameter.

During particular implementation, the game is not limited to a jump game, and the game may be such as a crazy-walking game, a race-walking game, and/or a car-racing game that contain jumps.

In embodiments of the disclosure, a game character can be controlled by obtaining a gesture change parameter of a user using an image acquisition module. In this way, the user can play a somatosensory game without wearing a special somatosensory device. In the first aspect, the cost of purchasing the special somatosensory device may be saved for the user. In the second aspect, the user does not need to wear a somatosensory device, which can improve user experience. In the third aspect, compared to game control with only fingers, the user can realize game control by body motions.

In some embodiments, the operation S120 may include: a squat parameter indicating a squat of the user is determined according to the plurality of images.

In embodiments of the disclosure, the gesture change corresponding to the gesture change parameter includes at least a squat. The squat is mainly achieved by bending knees to change the height of the body in a vertical direction.

In embodiments of the disclosure, a learning model is used to detect the images to determine whether the user squats or the like. For example, a deep learning model or a machine learning model is used to detect key points of user's imaging in the image, and the squat parameter is determined based on the key points.

The key points include but are not limited to: contour key points and skeleton key points.

The contour key points are preset points on the surface contour of user's body.

The contour key points include: one or more head contour key points, one or more arm contour key points, one or more hand contour key points, one or more shoulder contour key points, one or more leg contour key points, one or more waist contour key points, and/or one or more foot contour key points.

In some embodiments, the head contour key point includes one or more of: one or more head vertex key points, one or more nasal tip key points, one or more chin key points, one or more risorius key points, and one or more lip key points.

The arm contour key point includes one or more of: a wrist contour key point, an elbow contour key point, an arm root contour key point, a lower arm contour midpoint key point located at a midpoint position between the wrist contour key point and the elbow contour key point, and an upper arm midpoint key point located at a midpoint position between the elbow contour key point and the arm root contour key point.

The hand contour key point includes one or more of: a hand tip key point and a palm midpoint key point.

The shoulder contour key point includes one or more of: a shoulder-head intersection key point at the intersection of the shoulder and the head, and a shoulder contour midpoint key point at a midpoint position between the arm root contour key point and the shoulder-head intersection key point.

The leg contour key point includes one or more of: a crotch contour key point, a knee contour key point, an ankle contour key point, a thigh root outer-contour key point, a shank contour midpoint key point at a midpoint position between the knee contour key point and the ankle contour key point, a thigh inner-contour midpoint key point at a midpoint position between a knee inner-contour key point and the crotch contour key point, and a thigh outer-contour midpoint key point at a midpoint position between a knee outer-contour key point and the thigh root outer-contour key point.

The waist contour key point includes one or more of: N−1 number of equal division points produced by dividing the part between the thigh root outer-contour key point and the arm root contour key point into N equal parts, where N is greater than 1.

The foot contour key point includes one or more of: a tiptoe key point and a heel key point.

If the user's gesture changes, the position of the contour key points of the user also changes. Therefore, in some embodiments, the contour key points of the user may be detected to determine the gesture change parameter.

In still some embodiments, the key point may include skeleton key points. The skeleton key points are key points on a human skeleton. The skeleton key points are located inside a human body, in contrast to the contour key points. The skeleton key points may include: joint key points of various joints on the skeleton, for example, a shoulder joint, a knee joint, an ankle joint, an elbow joint, and a hip joint. The skeleton key points may also include: key points on some predetermined bones, for example, a pelvic key point, a waist key point and a neck key point. The pelvic key point may be a center point of the pelvis. The waist key point may be a center point of the waist, and the neck key point may be a center point of the cervical vertebrae. If the user's posture changes, the position of the skeleton key point also changes. In this way, in some embodiments, the gesture change parameter may also be determined by detecting the position of the skeleton key point in operation S120.

For example, in operation S120, the squat parameter may be determined according to the contour key points and/or the skeleton key points.

In operation S130, the game character is controlled according to the squat parameter. For example, the movement of the game character and the expression change of the game character are controlled.

Figure 7:
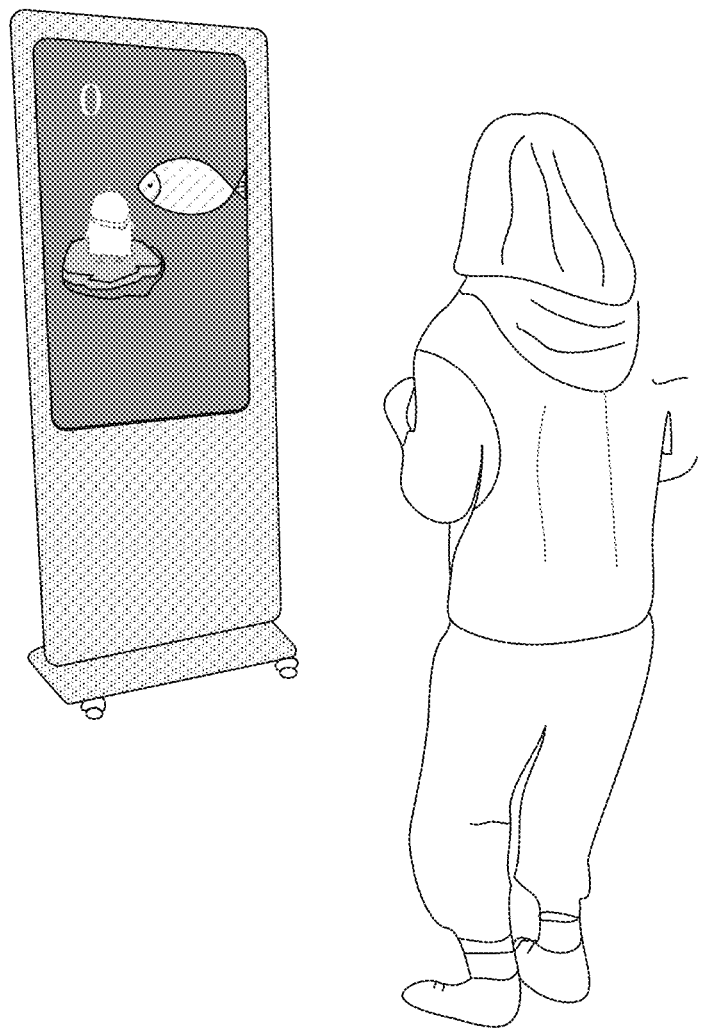
FIGS. 7, 8 and 9 illustrate schematic diagrams of display effects of a game process interface and corresponding body gestures of a user according to an embodiment of the disclosure.
Figure 8:
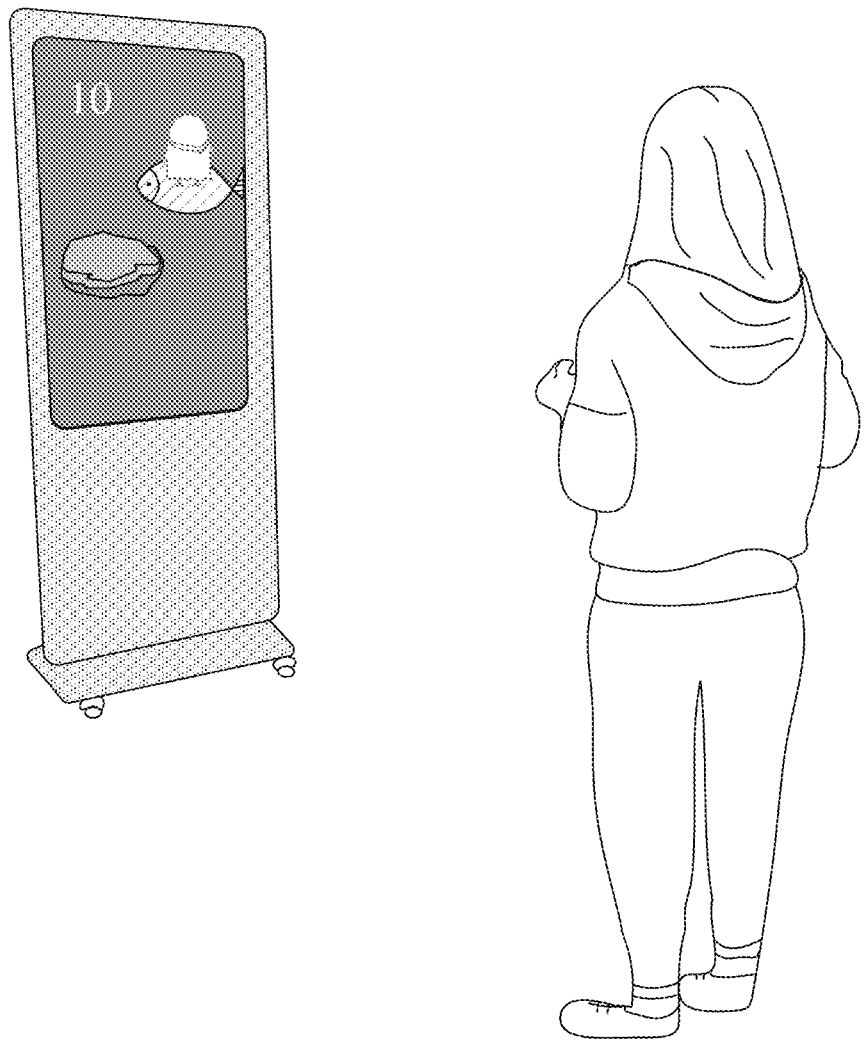

As illustrated in FIGS. 7 and 8, the user's squat is acquired by the game device through the image acquisition module, and the squat parameter is determined from the acquired images. As illustrated in FIG. 7, a game device controls a game character on a rock according to the squat parameter determined based on the acquired images, that is, the game character is controlled to jump from the rock to the back of a fish. The effect sketch of the game character jumping from the rock to the back of the fish may be as illustrated in FIG. 8.

Figure 9:
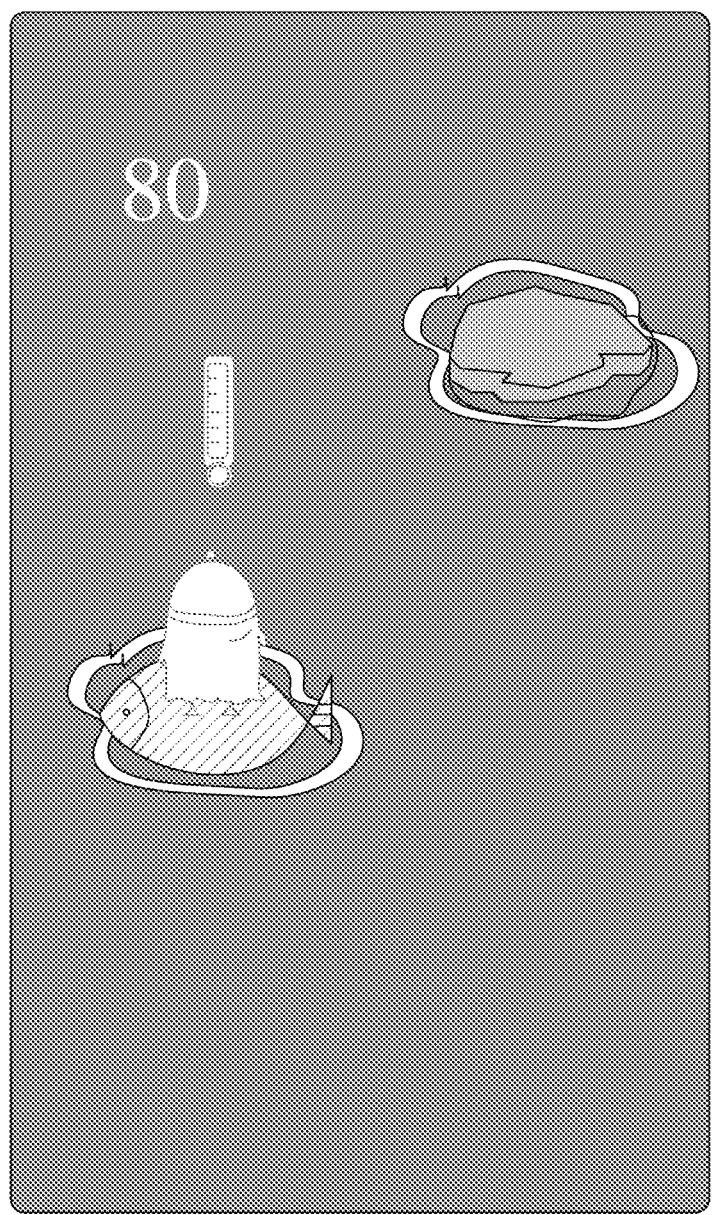
Figure 10:
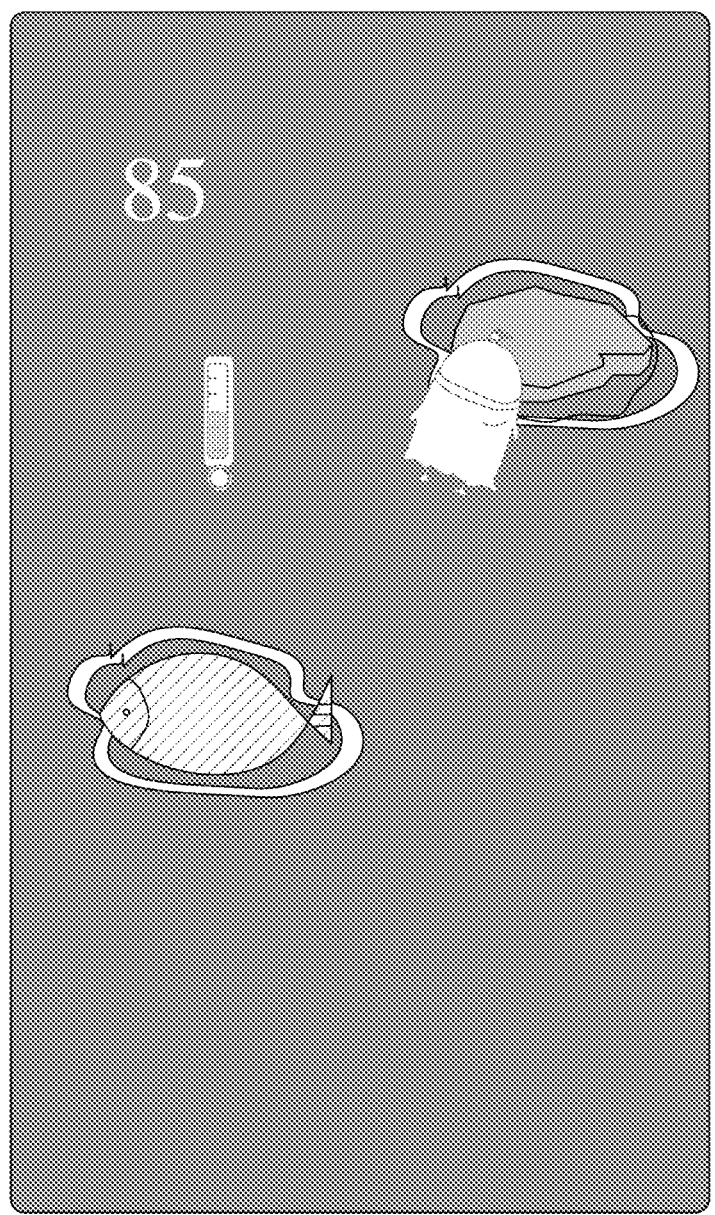
FIG. 10 illustrates a schematic diagram of a display effect of a game process interface according to an embodiment of the disclosure.

FIGS. 9 and 10 illustrate interfaces of another two frames of a game process based on the game interface illustrated in FIG. 7. In FIG. 9, the game character is on the back of the fish. If another squat is detected, the game character jumps from the back of the fish to another rock.

Figure 11:
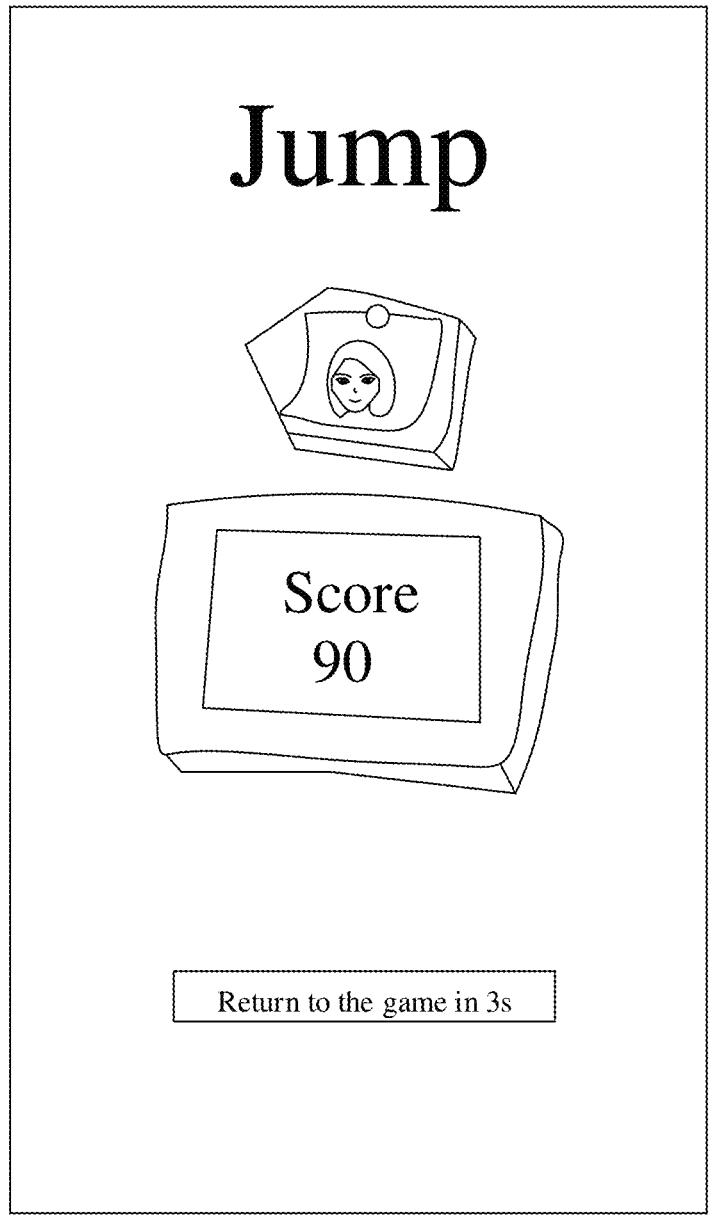
FIG. 11 illustrates another schematic diagram of a display effect of a game end interface according to an embodiment of the disclosure.

The current game score may also be seen on the game interface illustrated in FIGS. 7 to 10. In FIG. 7, the game is just started, and the game score is 0. In FIG. 8, because the game character makes a jump successfully, the game score rises to 10 points. The game score displayed on the game interface illustrated in FIG. 9 is 80, and the game score illustrated in FIG. 10 is 85. FIG. 11 illustrates an end picture of the game, and it is displayed on the end picture of the game that the score of this round of game is 90.

A prompt bar associated with game time is also illustrated in FIGS. 10 and 11. The prompt bar prompts accumulation parameters of the game character, such as an accumulation amplitude and an accumulation time. If the prompt bar is longer, the accumulation amplitude and/or the accumulation time are larger/longer, and the game character jumps farther or higher.

In some embodiments, the operation S130 may specifically include: a jump parameter of a jump of the game character is determined according to the squat parameter; and the jump of the game character is controlled according to the jump parameter.

The jump parameter includes but is not limited to at least one of: a jump direction, a jump strength, a jump distance, a jump height, a jump count, and a jump type such as an inplace jump and/or a not-inplace jump. When the game character jumps in place, it mainly jumps up and down in a vertical plane, and does not move in a horizontal plane. For not-inplace jump, there is a displacement in the horizontal plane.

In short, in embodiments of the disclosure, the jump parameter of the game character is determined according to the squat parameter, and then the jump of the game character is controlled using the determined jump parameter.

In some embodiments, the squat parameter includes elapsed time of a squat and an amplitude of the squat. The operation that the jump parameter of the jump of the game character is determined according to the squat parameter may include at least one of the following: the jump parameter of the game character is determined according to the elapsed time of the squat; and the jump parameter of the game character is determined according to the amplitude of the squat.

The elapsed time of the squat may be a first period elapsed from a start position of the squat to an end position of the squat, or a second period elapsed from the start position of the squat to the end position of the squat and then back to the start position again.

In embodiments of the disclosure, the elapsed time of the squat may serve as one of the jump parameters of the game character.

The amplitude of the squat may be: the span of the squat that the user bends knees from an upright state to the end position.

Here, the amplitude of the squat may also serve as one of the jump parameters for controlling the jump of the game character.

In still some embodiments, the squat parameter may further include: a squat direction. For example, the user squats with both legs bent towards the left to form a left squat. For another example, the user squats with both legs bent towards the right to form a right squat.

In short, in embodiments of the disclosure, the jump parameter of the game character is controlled according to one or more of the detected squat parameters.

In some embodiments, the jump parameter includes at least one of: an accumulation time of a jump power of the game character; the jump power of the game character; an accumulation speed of the jump power of the game character; and a jump distance of the game character.

Before jumping, the game character needs to accumulate a jump power. In embodiments of the disclosure, the jump parameter may include an accumulation time of a jump power. For example, the jump power is accumulated according to a preset accumulation speed, and the accumulation time is equal to the elapsed time of the squat, so that the game character can accumulate the jump power during the elapsed time of the squat.

In some embodiments, the current accumulation time of the power is displayed on the game interface, so that the user can determine, according to the accumulation time, whether to continue squatting further or maintain the squatting gesture, thereby controlling the accumulation of the jump power of the game character. The amplitude of the jump power directly determines the jump height and/or jump distance of the game character. In general, the greater the jump power, the greater the jump height and/or the jump distance of the game character.

For example, a first mapping relationship between the squat parameter and the accumulation time is determined in advance. For example, the first mapping relationship between the elapsed time of the squat and the accumulation time is determined, and the elapsed time of the squat of the user may be mapped to the accumulation time according to the first mapping relationship. As an example, the accumulation time is equal to the elapsed time of the squat. Further preferably, the accumulation time is synchronized with the elapsed time of the squat. As another example, the accumulation time is A % of the elapsed time of the squat, and A is a positive integer less than or equal to 100.

In some other embodiments, the jump parameter may be a jump power. For example, a second mapping relationship of the elapsed time of the squat and/or the amplitude of the squat with the jump power may be established. In this way, according to the second mapping relationship and at least one of the elapsed time of the squat and the amplitude of the squat, the jump power may be easily determined. In this way, in operation S130, the jump of the game character may be controlled according to the jump power.

In some embodiments, the accumulation time of each jump of the game character is fixed, but the accumulation speed of the jump power is determined according to the squat parameter of the user. For example, the accumulation speed is determined according to the amplitude of the squat. For example, a third mapping relationship between the squat parameter and the accumulation speed may be established, and the squat parameter of the user may be converted into the accumulation speed according to the third mapping relationship.

In still some embodiments, a fourth mapping relationship between the squat parameter and the jump distance is determined in advance. In particular implementation, the current squat parameter acquired based on the images may be converted into the jump distance based on the fourth mapping relationship.

In short, in embodiments of the disclosure, in operation S130, a jump parameter may be determined according to the detected squat parameter and a preset mapping relationship, and then, the jump of the game character is controlled based on the jump parameter.

In still some embodiments, in order to facilitate the user in determining whether the current jump parameter can enable the game to be passed successfully or smoothly, prompt information is also formed. The prompt information may be a prompt bar. For example, the height of the prompt bar corresponds to a parameter value of the jump parameter. For example, description is made with the jump parameter being a jump power as an example. The greater the jump power, the higher the prompt bar.

In some embodiments, the jump force required for this jump is indicated by a hollow prompt bar. The prompt bar is provided with a prompt bar filling that changes with the squat gesture parameter, so that the user can control the squat gesture of his/her own according to the current filling height of the prompt bar, to improve the success rate, scoring rate or pass rate of the game.

Besides the prompt bar, the prompt information may also be a prompt in a text form. For example, the prompt text is: a ratio, and/or difference, and/or correction information between the jump parameter obtained based on the current squat parameter and the required jump parameter. In this way, the user can also adjust the squat of his/her own in a timely manner according to the prompt text, so as to obtain the jump parameter required for game pass or scoring.

Figure 2:
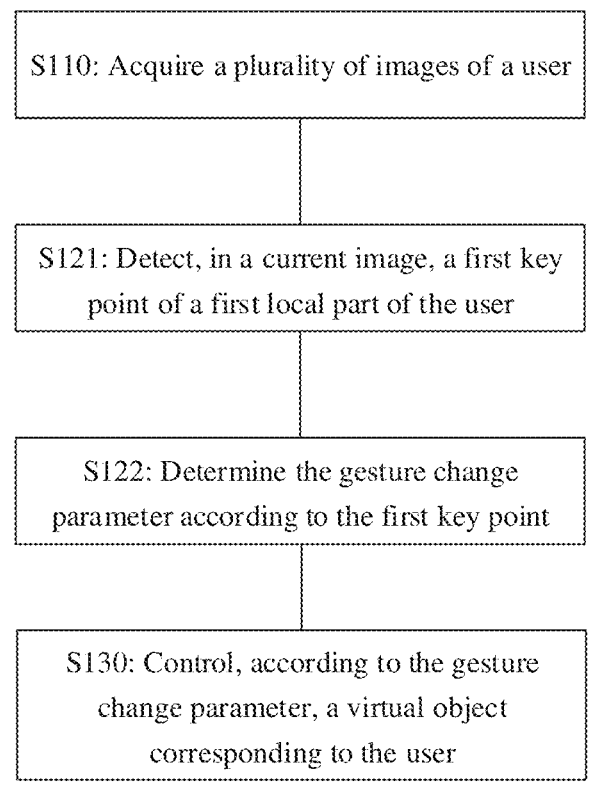
FIG. 2 illustrates a schematic flowchart of a second method for controlling a virtual object according to an embodiment of the disclosure.

In some other embodiments, as illustrated in FIG. 2, the operation S120 may include the following operations. In operation S121, a first key point of a first local part of the user is detected in a current image. In operation S122, the gesture change parameter is determined according to the first key point.

In some embodiments, in operation S120, all the key points of the user may be detected based on the image. In embodiments of the disclosure, in order to reduce the computational complexity and increase the processing speed, the first key point of the first local part of the user is obtained according to the current image.

The first local part may be one or more of: the trunk, the head and the limbs of the user.

In this way, the first key point of the first local part is detected instead of detecting key points of the entire body of the user, so that the computation quantity can be reduced while realizing control of the game.

In some embodiments, in operation S121, the current image may be a first image selected from the plurality of images. In actual implementation, one frame of image may be extracted, for key point detection, from a plurality of frames of images acquired by the image acquisition module. A frame extraction rule may be determined in advance. For example, a frame of image may be extracted based on information of key parts of the user, or may be extracted according to a preset frequency and sequence. This is not limited in the disclosure.

In image processing, due to the huge amount of video data, if each frame of image data is processed, the computation performance will decrease. Through the frame extraction, the amount of computation can be greatly reduced. Moreover, as long as the refresh rate of the video data reaches a predetermined value, such as dozens of frames per second, the visual feeling of the user is almost real-time. Therefore, by controlling the frame extraction speed, good watching experience can be ensured for the user.

In some embodiments, the first local part is a face. The operation S121 may include: a first face key point is detected in the current image. The operation S122 may include: a previous image is searched, based on the first face key point, for a second face key point corresponding to the first face key point, and the gesture change parameter is determined based on a relative position difference between the first face key point and the second face key point.

In some embodiments, the previous image may be a second image selected from the plurality of images. When determining the gesture change parameter by comparing the positions of the respective key points, the current image may be compared with each frame of image in a preset time period taken earlier than the current image. However, in order to reduce the amount of computation, the previous image may also be determined by frame extraction in the embodiment.

The game is controlled with the user's squat gesture. Under the condition that the acquisition conditions of the image acquisition module remain unchanged, the user squatting and getting up causes the coordinate position of the face imaging in the image to change. Therefore, in embodiments of the disclosure, based on this feature, the operation S121 may be: a first face key point in the current image is detected. The first face key point includes, but is not limited to, a face center key point, a nasal tip key point, a forehead key point, a chin key point, an eye key point, an eyebrow key point, a hairline key point, and a head vertex key point.

In embodiments of the disclosure, whether the current face position of the user relative to the face position in the previous image changes in height in the vertical plane may be determined based on one or more of the above key points.

In some embodiments, the first face key point may be a face outer-contour key point. The face outer-contour key point may include multiple key points, such as 3, 4, or 5 key points. A face box is obtained by successively connecting the face outer-contour key points.

In the operation S122 in the embodiments of the disclosure, the gesture change parameter may be determined based on the position change of the face box. For example, the position of the face box in the current image is compared with that in the previous image, to obtain a relative position difference, and whether the user squats or gets up is determined based on the relative position difference.

For example, if the position of the face box in the current image is higher than the position of the face box in the previous image, it may be considered that the user gets up. If the position of the face box in the current image is lower than the position of the face box in the previous image, it may be considered that the user squats.

In some embodiments, the user may have some unconscious actions. In order to reduce the interference of these unconscious actions on game control, a tolerance threshold may also be introduced in the embodiments of the disclosure.

For example, it is determined whether the user squats, rather than nodding or slightly bending the waist, which causes the position of the face box to be descended. When the amplitude of the decrease of the face box in the current image compared with the face box in the previous image reaches a descent threshold, it is determined that the user squats. For example, the descent threshold may be such as 10% of the user's face length or 10% of the face width. Here, 10% is an example of the ratio, and it is not limited to this value in particular implementation. For example, the ratio may also be such as 20% or 15%.

For another example, in determining whether the user gets up, a tolerance threshold may also be introduced to reduce errors caused by slight tiptoeing of the user. For example, if the position of the face box in the current frame relative to the face box in the previous frame is greater than a rise threshold, it is determined that the user gets up. For example, the second amplitude may be such as 10% of the user's face length or 10% of the face width.

The tolerance threshold includes the aforementioned rise threshold and descent threshold. In some embodiments, the rise threshold and the descent threshold may be equal to or different from each other.

During the game, the probability of tiptoeing of the user is generally lower than the probability of waist bending. At this time, in order to reduce miscontrol caused by waist bending or tiptoeing not intended to control the game character the tolerance thresholds are determined according to the occurrence probabilities of the body gestures that may cause miscontrol in the embodiments of the disclosure. Optionally, the occurrence probabilities are positively correlated with the tolerance thresholds respectively. For example, if the occurrence probability of tiptoeing is lower than the occurrence probability of waist bending, the rise threshold corresponding to tiptoeing is smaller than the descent threshold corresponding to waist bending.

Figure 3:
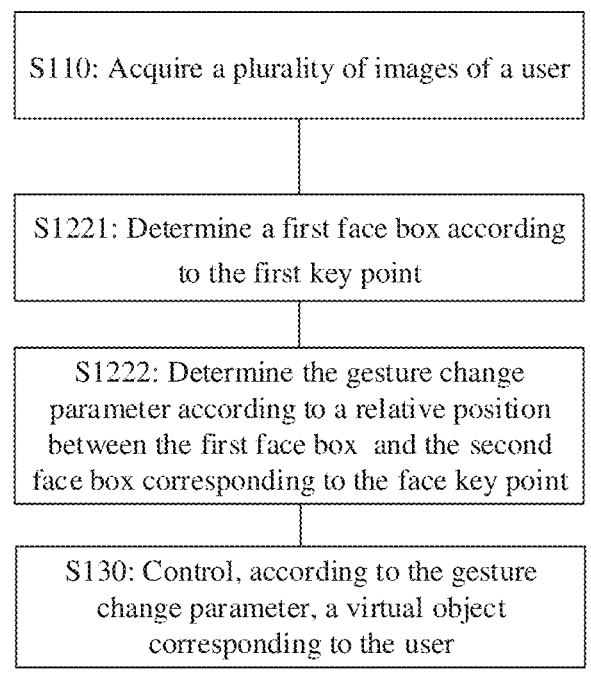
FIG. 3 illustrates a schematic flowchart of a third method for controlling a virtual object according to an embodiment of the disclosure.

Therefore, in some embodiments, as illustrated in FIG. 3, the operation S122 may include the following operations. In operation S1221, a first face box is determined according to the first face key point. In operation S1222, the gesture change parameter is determined according to a relative position between the first face box and a second face box corresponding to the second face key point.

For example, the operation S1222 may specifically include: if a change of position the first face box relative to the second face box in a preset direction exceeds a preset threshold, it is determined that the gesture of the user in the preset direction changes.

In the embodiments of the disclosure, in order to avoid misoperation caused by unconscious gesture changes of the user's body, whether the change of position of the first face box relative to the second face box in a preset direction (for example, a vertical direction or a horizontal direction, where the vertical direction is perpendicular to the horizontal direction) exceeds a preset threshold is determined, and if yes, it is determined that the user has a gesture change. The game character is further controlled according to the gesture change.

Further, the operation S1222 may include at least one of the following: if an amount of descending of the first face box compared with the second face box in a vertical direction exceeds the descent threshold, it is determined that that the user squats; and if an amount of rise of the first face box compared with the second face box in the vertical direction exceeds the rise threshold, it is determined that the user gets up.

In some embodiments, the operation S121 may include: a first key point of the first local part is detected in a current image.

Figure 4:
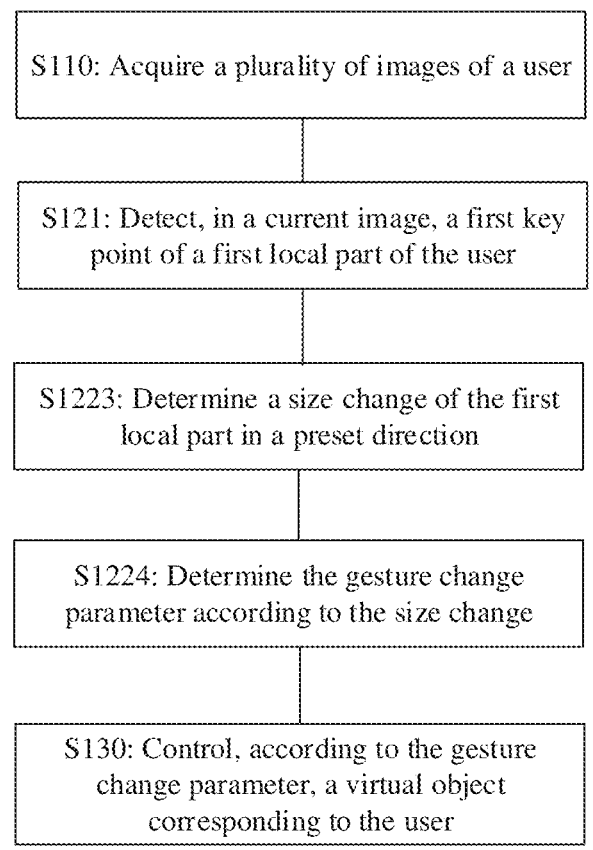
FIG. 4 illustrates a schematic flowchart of a fourth method for controlling a virtual object according to an embodiment of the disclosure.

As illustrated in FIG. 4, the operation S122 may include the following operations. In operation S1223, a size change of the first local part in a preset direction is determined according to the first key point. In operation S1224, the gesture change parameter is determined according to the size change.

In embodiments of the disclosure, the first key point is a key point of the first local part, for example, key points corresponding to two end points of the first local part in a preset direction.

In embodiments of the disclosure, if the user squats or gets up, strides or retracts the legs, the length of the legs and/or the length of the trunk in the vertical direction changes.

In embodiments of the disclosure, the size change of the first local part in the preset direction may be determined according to the first key point, and then the gesture change parameter may be easily determined based on the size change.

For example, if the user squats down, the body height decreases. The decrease in the body height is reflected in the size change.

For example, the size change is obtained by comparing the body height value in the current image with the body height value in the previous image. If the size change indicates that the body height value in the current image decreases, it indicates that the user squats, otherwise, the user does not squat.

In some other embodiments, the operation S1224 may include at least one of the following: if the size of the first local part in the preset direction is reduced, it is determined that the user squats, and if the size of the first local part in the preset direction is increased, it is determined that the user gets up.

Further, the operation S1224 includes: if a reduction value of the size is greater than a reduction threshold, it is determined that the user squats. Here, the reduction value of the size here is a size change corresponding to the size reduction.

In some embodiments, the operation S1224 may further include: if an increase value of the size is greater than an increase threshold, it is determined that the user gets up. Here, the increase value of the size may be a size change corresponding to the size increase.

In embodiments of the disclosure, in order to reduce miscontrol as well, the reduction value of the size and/or the increase value of the size are introduced as the tolerance thresholds.

Only if a size change is greater than the corresponding tolerance threshold, the user is identified to be presenting the corresponding gesture.

In some embodiments, the increase threshold and the reduction threshold may be equal to or different from each other, and the specific values thereof may be determined as needed, or may be determined according to the body size of the user presented in the image. For example, the increase threshold and the reduction threshold are determined based on the body height of the user maintaining an upright gesture. For another example, the increase threshold and the reduction threshold are determined based on the body width of the user maintaining the upright gesture. By multiplying the body size by a proportion coefficient, the tolerance threshold corresponding to the size change can be obtained.

Of course, there are many ways to determine the tolerance threshold, the above are only examples. In particular implementation, the disclosure is not limited to any of the above.

In some other embodiments, the operation S121 may include: a first trunk key point is detected in the current image. The operation S1223 may include: a first trunk size in a predetermined direction is determined based on the first trunk key point; a previous image is searched for a second trunk key point corresponding to the first trunk key point; a second trunk size in the predetermined direction is determined based on the second trunk key point; and a size change of the trunk is determined according to the first trunk size and the second trunk size. The trunk is the part of the body excluding the limbs and the head.

Correspondingly, in operation S1224, the gesture change parameter is determined according to the size change of the trunk.

The process of body squatting of the user must be accompanied by curling of the waist, which reduces the length of the trunk in the vertical direction.

In some other embodiments, the operation S121 may include: a first limb key point is detected in the current image. The operation S1223 may include: a first limb size in a predetermined direction is determined based on the first limb key point; a previous image is searched for a second limb key point corresponding to the first limb key point; a second limb size in the predetermined direction is determined based on the second limb key point; and the size change of the limb is determined according to the first limb size and the second limb size.

Correspondingly, the operation S1224 may include: the gesture change parameter is determined according to the size change of the limb.

For example, if the size change of the limb indicates that the size of the limb is reduced, it is determined that the user squats.

In some embodiments, the first limb key point is a lower limb key point.

Of course, in some other embodiments, if the control of the game character is achieved by extending an arm, the size change of the limb may also be: the length change of an upper limb in the horizontal direction.

In some other embodiments, the operation S120 may also include: a gesture change parameter of a second local part of the user is determined according to the images. The operation S130 may include: a jump direction of the game character is controlled according to the gesture change parameter of the second local part.

Here, the second local part may be a local part different from the aforementioned first local part, or may be the same local part as the first local part.

In embodiments of the disclosure, the gesture change parameter of the second local part is also obtained, and the gesture change parameter of the second local part may be different from the gesture change parameter of the first local part.

In embodiments of the disclosure, a jump direction of the game character is controlled using the gesture change parameter of the second local part.

In some other embodiments, the operation S120 may include at least one of the following: the orientation of the second local part of the user is determined according to the plurality of images; and a stretch direction of the second local part of the user is determined according to the image.

For example, the three key points of the second local part that are not on the same straight line are acquired to construct two vectors formed by connecting one of the three key points to each of the other two different key points, and a cross product of the two vectors is calculated to obtain another vector. The obtained vector is the orientation of the second local part.

For example, the jump direction of the game character is controlled according to such as the trunk orientation or the head orientation of the user.

For example, a plurality of jump paths are provided in the game, and the game character may jump in different directions at the current position. At this time, the jump direction of the game character may be controlled according to the orientation of the second local part.

In some other embodiments, the second local part may be an upper limb, and the stretch direction of the upper limb, for example, stretching to the left or stretching to the right, may also be used to control the jump direction of the game character.

In some other embodiments, the operation that the orientation of the second local part of the user is determined according to the plurality of image includes that: the orientation of the user's face is determined according to the plurality of images; and/or, the operation that the stretch direction of the second local part of the user is determined according to the plurality of images includes that: the stretch direction of the upper limb of the user is determined according to the plurality of images.

In some other embodiments, the method further includes the following operations. An interface containing a body contour box is displayed. Whether a first area corresponding to the user in the interface and a second area corresponding to the body contour box satisfy a preset relative position relationship is detected. It is started to capture the plurality of images of the user if the preset relative position relationship is satisfied.

In actual implementation, an interface for reflecting the process of controlling the virtual object may be displayed on a terminal device, to facilitate the user in controlling the virtual object. For example, when the control process is not started yet, an interface including a body contour box may be displayed on the terminal device to prompt the user to prepare to start the control.

Figure 5:
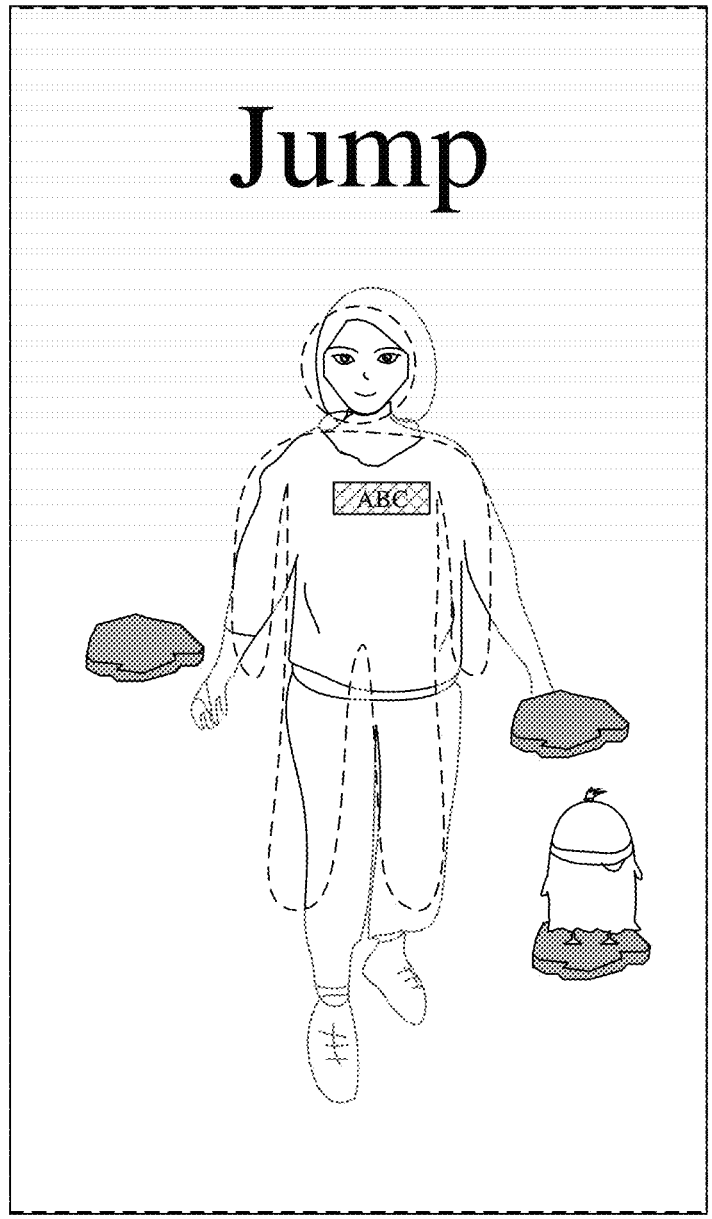
FIG. 5 illustrates a schematic effect sketch of a game start interface according to an embodiment of the disclosure.

With the terminal device being a game device as an example, as illustrated in FIG. 5, a dashed body contour box is displayed on a game start interface. Before starting the game, the user can adjust his/her own position so that imaging of the user in an image acquired by the game device corresponds to the body contour box.

Figure 6:
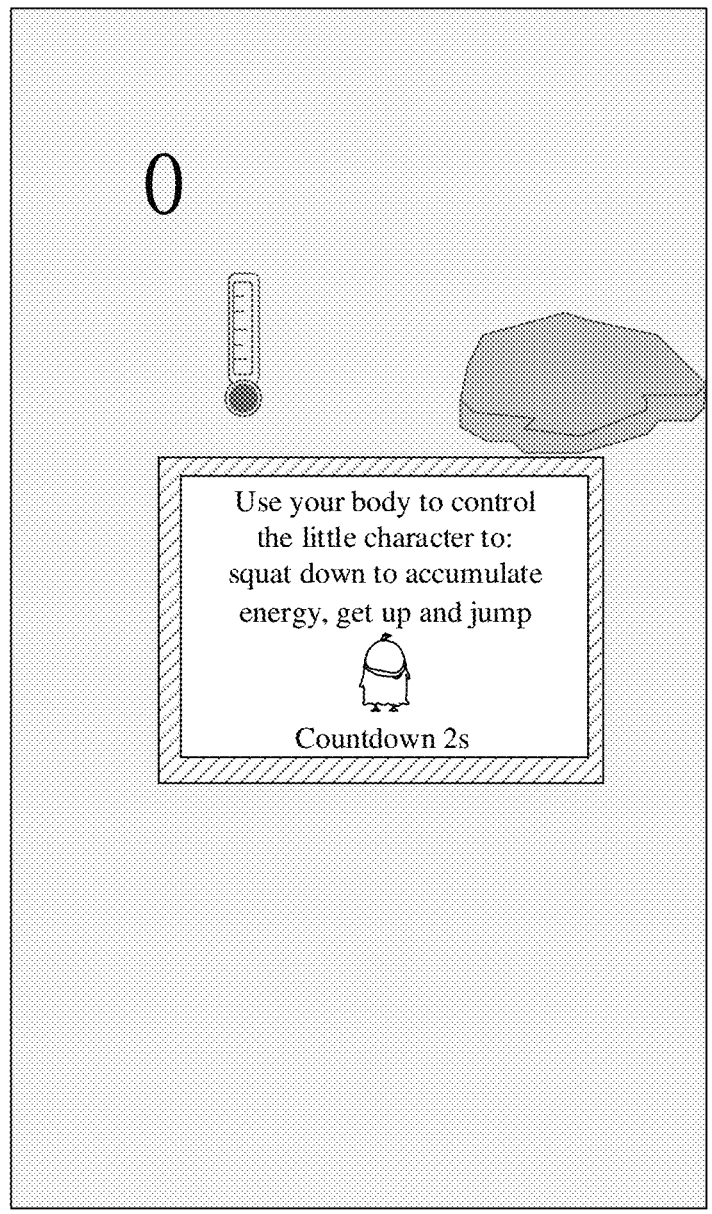
FIG. 6 illustrates a schematic effect sketch of a game prompt interface according to an embodiment of the disclosure.

FIG. 6 illustrates a game prompt interface when the game is officially entered after the game is started. The prompt interface displays prompt information to prompt the user how to play the game.

The display duration of the game prompt interface is limited. The game device starts a display countdown since the game prompt interface is displayed. Once the countdown ends, the display of the game prompt interface is quit, and a game process interface is entered officially. The game process interface is as illustrated in FIGS. 7 to 10.

The game terminal displays a game start interface and acquire an image at the same time. If the user is located at a predetermined position, the acquired image overlaps with the game start interface in a predetermined manner, and the ratio of the user overlapping with the second area reaches a preset value.

In short, if the first area and the second area satisfy the preset relative position relationship, it indicates that the user enters a game-ready state, and the game can be started at this time.

The game starts after the preset relative position relationship is satisfied, and the game terminal switches from displaying the game start interface to displaying the game interface. The game scene and the game character obtained in the game scene are displayed on the game interface.

In some embodiments, the game start interface includes: a first display layer, which contains the body contour box; and a second display layer, which is generated based on the acquired image.

Reference can be made to those illustrated in FIG. 5. The first display layer is a transparent display layer, and the transparent display layer is transparent in a blank area. Thus, the second display layer can be seen when placed under the first display layer. In this way, when the acquired image of the user is placed under the first display layer, the user can adjust the position of his/her own according to the relative position relationship between the imaging of the user and the body contour box, so that the imaging of the user and the body contour box satisfy the preset relative position relationship to indicate that the game is ready to start.

In still some embodiments, the body contour box may be generated according to the acquired image, and the second area of the body contour box on the game start interface is also determined by the device according to the location of the user in the acquired image.

In short, in order to quickly locate the user in the image in the subsequent, the second area where the body contour box is located can be prioritized for detecting the imaging of the user, thereby speeding up the speed in acquiring a gesture change parameter in the subsequent and improving the response rate of the game terminal.

In some embodiments, the operation S130 may include: the game character is controlled to jump in a specified direction according to the gesture change parameter.

The specified direction may be a direction determined by the game itself, and is related to the progress of the game. For example, the specified direction may be a direction in which a jump target, in the game, for recepting the game character is located. Referring to FIG. 9, the specified direction is a direction from the game character towards the rock. Referring to FIG. 7, the specified direction is the direction from the game character towards the fish.

In the technical solutions provided in the embodiments of the disclosure, images are acquired, a gesture change parameter of a gesture change of a user is obtained based on the images, and a virtual object corresponding to the user is controlled using the gesture change parameter. In this way, the virtual object corresponding to the user may be controlled using the detected gesture of the user, and there is no need to use special somatosensory devices, thereby reducing investment in hardware.

Figure 12:
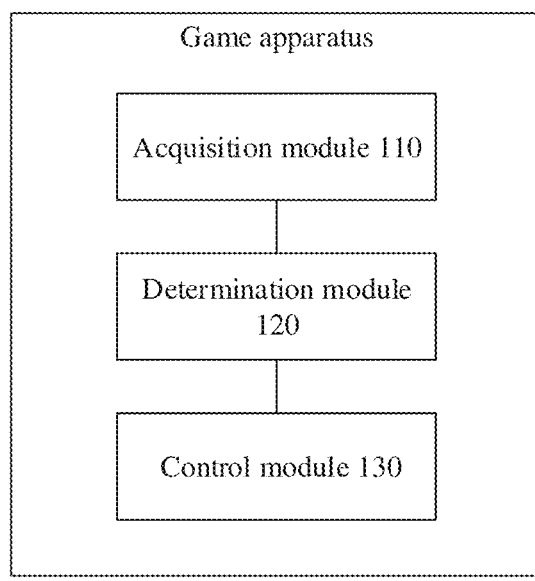
FIG. 12 illustrates a schematic structural diagram of an apparatus according to an embodiment of the disclosure.

As illustrated in FIG. 12, an apparatus for controlling a virtual object is provided in embodiments of the disclosure. The apparatus includes: an acquisition module 110, a determination module 120 and a control module 130. The acquisition module is configured to acquire a plurality of images of a user. The determination module 120 is configured to determine a gesture change parameter of a gesture change of the user according to the plurality of images. The control module 130 is configured to control, according to the gesture change parameter, a virtual object corresponding to the user.

In some embodiments, the acquisition module 110, the determination module 120 and the control module 130 may be program modules that, after being executed by a processor, can realize image acquisition, gesture change parameter determination, and control of a virtual object.

In some other embodiments, the acquisition module 110, the determination module 120 and the control module 130 may be modules combining software and hardware. The modules combining software and hardware may include various programmable arrays. The programmable arrays may be complex programmable arrays or field programmable arrays.

In still some embodiments, the acquisition module 110, the determination module 120 and the control module 130 may be pure hardware modules. The pure hardware modules include, but are not limited to, application-specific integrated circuits.

In some other embodiments, the gesture change parameter includes a squat parameter.

In some embodiments, the control module 130 includes: a first determination sub-module and a control sub-module. The first determination sub-module is configured to determine, according to the squat parameter, a jump parameter of a jump of the virtual object. The control sub-module is configured to control the jump of the virtual object according to the jump parameter.

In still some embodiments, the squat parameter includes at least one of: elapsed time of a squat and an amplitude of the squat.

In still some embodiments, the jump parameter includes at least one of: an accumulation time of a jump power; the jump power; an accumulation speed of the jump power; or a jump distance.

In some embodiments, the determination module 120 includes: a detection sub-module and a second determination sub-module. The detection sub-module is configured to detect, in a first image of the plurality of images, a first key point of a first local part of the user, and detect, in a second image of the plurality of images, a second key point of the first local part. The second determination sub-module is configured to determine the gesture change parameter according to the first key point and the second key point.

In some embodiments, the first local part is a face of the user, the first key point is a first face key point, and the second key point is a second face key point. The second determination sub-module is specifically configured to determine a first face box according to the first face key point, determine a second face box according to the second face key point, and determine the gesture change parameter according to a position of the first face box relative to the second face box.

In some embodiments, the second determination sub-module is specifically configured to: in response to determining that a change of position of the first face box relative to the second face box in a preset direction exceeds a preset threshold, determine that a gesture of the user in the preset direction changes.

In some embodiments, the second determination sub-module is specifically configured to perform at least one of the following: in response to determining that an amount of descending of the first face box compared with the second face box in a vertical direction exceeds a descent threshold, determining that the user squats; or in response to determining that an amount of rise of the first face box compared with the second face box in the vertical direction exceeds a rise threshold, determining that the user gets up.

In some embodiments, the second determination sub-module is specifically configured to: determine, according to the first key point and the second key point, a size change of the first local part in a preset direction; and determine the gesture change parameter according to the size change.

In some embodiments, the second determination sub-module is specifically configured to: in response to determining that a size of the first local part in the preset direction is reduced, determine that the user squats; or in response to determining that the size of the first local part in the preset direction is increased, determine that the user gets up.

In some embodiments, the second determination sub-module is further configured to: in response to determining that a reduction value of the size is greater than a reduction threshold, determine that the user squats.

In some embodiments, the second determination sub-module is further configured to: in response to determining that an increase value of the size is greater than an increase threshold, determine that the user gets up.

In some embodiments, the first local part is a trunk of the user, the first key point includes first trunk key points, and the second key point includes second trunk key points. The second determination sub-module is specifically configured to: determine, based on the first trunk key points, a first trunk size in a predetermined direction; determine, based on the second trunk key points, a second trunk size in the predetermined direction; and determine a size change of the trunk according to the first trunk size and the second trunk size.

In some embodiments, the first local part is a limb of the user, the first key point includes first limb key points, and the second key point includes second limb key points. The second determination sub-module is specifically configured to: determine, based on the first limb key points, a first limb size in a predetermined direction; determine, based on the second limb key points, a second limb size in the predetermined direction; and determine a size change of the limb according to the first limb size and the second limb size.

In some embodiments, the first limb key point is a lower limb key point.

In some embodiments, the determination module 120 is further configured to determine a gesture change parameter of a second local part of the user according to the plurality of images; and the control module 130 is further configured to control a jump direction of the virtual object according to the gesture change parameter of the second local part.

In some embodiments, the gesture change parameter of the second local part includes at least one of: an orientation of a face, or a stretch direction of an upper limb.

In some embodiments, the apparatus further includes a display module and a detection module. The display module is configured to display an interface containing a body contour box. The detection module is configured to detect whether a first area in the interface corresponding to the user and a second area in the interface corresponding to the body contour box satisfy a preset relative position relationship. The acquisition module is further configured to: in response to that the preset relative position relationship is satisfied, start to acquire the plurality of images of the user.

In some embodiments, the control module 130 is specifically configured to control the virtual object to jump towards a specified direction according to the gesture change parameter.

A specific example is provided below in conjunction with any of the above embodiments. With development of computer vision technologies, by means of imaging with common cameras combined with deep learning algorithms, human body key point recognition, human body key point tracking, gesture recognition, etc., may be implemented. Thus brand new options for virtual object control are provided. This mode has the characteristics of such as a high accuracy, strong expansibility, low costs, and support for a plurality of scenarios.

In a current implementation, whether the user is performing a squat/get-up operation is determined according to a position change of a face key point of a user, so as to control the virtual object. Specifically, in the algorithm, the coordinates (for example, four point coordinates of a face box) of the face key point of the user are returned. When a Y value of the face key point of the user changes more than ±10% of a face width (X1-X2), it is determined that the user squats/gets up. Similarly, various actions such as raising a hand, waving a hand, and shaking the head may be judged.

In another possible implementation, in the algorithm, the coordinates of key points for the entire body of the user are returned. The length of each part is calculated according to the coordinates, such as height, upper body length, and thigh length. The user's action at the present is judged according to the change of the length of each part, and a ratio between the lengths of the parts.

When a virtual control interface is on the home page, if it is detected that the user's entire body is in the area where the body contour box on the screen is located, the control process is automatically started.

The control page (corresponding to the aforementioned game process interface) is entered, the user "squats" to start accumulating a power, and the user "gets up" to trigger a jump. As the accumulation time is longer, the jump distance is longer.

If the user successfully jumps to a target object, the control continues. If the jump distance is too large or too small, the control ends and a result page is entered.

Figure 13:
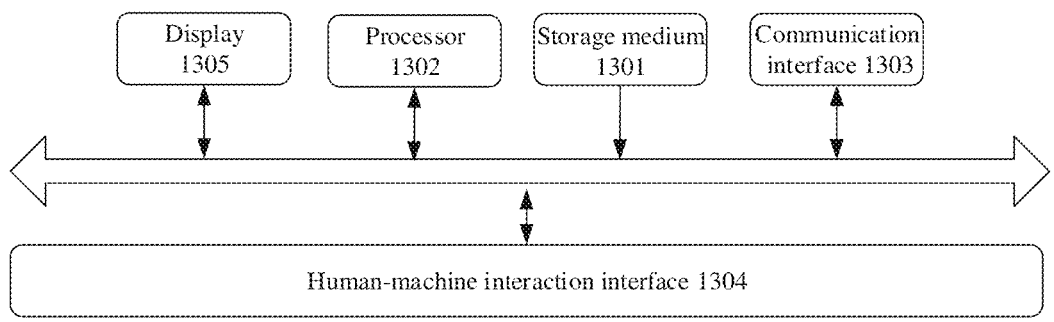
FIG. 13 illustrates another schematic structural diagram of a terminal according to an embodiment of the disclosure.

As illustrated in FIG. 13, a terminal is provided in an embodiment of the disclosure. The terminal includes: a storage medium 1301; and a processor 1302, connected to the storage medium, and configured to execute machine-executable instructions on the storage medium to implement the method for controlling a virtual object provided in any of the technical solutions above, for example, one or more of the control methods illustrated in FIGS. 1 to 4.

The storage medium may be various types of memories, such as a Random Access Memory (RAM), a Read-Only Memory (ROM) and a flash memory. The storage medium may be configured to store information, for example, machine-executable instructions. The machine-executable instructions may be various program instructions, such as target program instructions and/or source program instructions.

The processor may be various types of processors, such as a central processor, a microprocessor, a digital signal processor, a programmable array, a digital signal processor, an application-specific integrated circuit, or an image processor.

The processor may be connected to the storage medium through a bus. The bus may be an integrated circuit bus, etc.

In some embodiments, the terminal may further include: a communication interface 1303. The communication interface may include: a network interface such as a local area network interface, or a transceiver antenna. The communication interface is also connected to the processor, and is capable of transceiving information.

In some embodiments, the terminal further includes a human-machine interaction interface 1304. For example, the human-machine interaction interface may include various input/output devices, such as a joystick, a keyboard, and a touch screen.

In some embodiments, the terminal further includes a display 1305 for displaying a control interface for a virtual object.

Provided in an embodiment of the disclosure is a storage medium with machine-executable instructions stored thereon. After being executed, the machine-executable instructions can be applied to the control method provided in one or more technical solutions in a terminal, a database and a first private network, such as one or more of the methods illustrated in FIGS. 1 and/or 2.

The storage medium may include various recording media with recording functions, for example, various storage media such as a compact disk (CD), a floppy disk, a hard disk, a magnetic tape, an optical disk, a USB flash drive, or mobile hard disk. Optionally, the storage medium may be a non-transitory storage medium, and the storage medium may be read by the processor, so that after the machine-executable instructions stored on the storage medium are acquired and executed by a first processor, the control method provided in any of the foregoing technical solutions can be implemented, for example, the control method applied in a terminal or the control method in an application server can be performed.

Also provided in an embodiment of the disclosure is a computer program product including computer-executable instructions. After being executed, the computer-executable instructions can implement the control method provided in one or more technical solutions above, such as one or more of the control methods illustrated in FIGS. 1 to 4.

The computer program product includes a computer program tangibly contained on a computer storage medium. The computer program includes program codes for executing the method illustrated in the flowchart. The program codes may include corresponding instructions for correspondingly performing the method operations provided in the embodiments of the disclosure.

In the several embodiments provided in the disclosure, it should be understood that the disclosed device and method may be implemented in other manners. The device embodiment described above is only schematic, and for example, division of the units is only logic function division, and other division manners may be adopted during practical implementation. For example, a plurality of units or components may be combined or integrated into another system, or some features may be neglected or not executed. In addition, coupling or direct coupling or communication connection between various displayed or discussed components may be indirect coupling or communication connection implemented through some interfaces, devices or units, and may be electrical, mechanical or in other forms.

The units described as separate parts above may or may not be physically separated, and parts displayed as units may or may not be physical units, and namely may be located in the same place, or may also be distributed to a plurality of network units. Some or all of the units may be selected according to a practical requirement to achieve the purposes of the solutions of the embodiments of the disclosure.

In addition, each function unit in embodiments of the disclosure may be integrated into a processing module. Each unit may also exist independently. Two or more than two units may also be integrated into one unit. The integrated unit may be implemented in a hardware form, and may also be implemented in form of hardware and software function unit.

Those of ordinary skill in the art should know that all or some of the operations of the above method embodiment may be implemented by instructing related hardware through a program. The above program may be stored in a machine-readable storage medium. The program, when executed, implements the operations of the above method embodiment. The storage medium includes: various media capable of storing program codes such as mobile storage equipment, a ROM, a RAM, a magnetic disk or an optical disc.

The above are only particular implementations of the disclosure and are not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subjected to the scope of protection of the claims.

The invention claimed is:

1. A method for controlling a virtual object, comprising:
acquiring a plurality of images of a user;
detecting, in a first image of the plurality of images, a first key point of a first local part of the user;
detecting, in a second image of the plurality of images, a second key point of the first local part;
determining a gesture change parameter according to the first key point and the second key point, comprising:
   determining, according to the first key point and the second key point, a size change of the first local part in a preset direction, and
   determining the gesture change parameter according to the size change, comprising at least one of:
      in response to determining that a size of the first local part in the preset direction is reduced, determining that the user squats; or
      in response to determining that the size of the first local part in the preset direction is increased, determining that the user gets up; and
controlling, according to the gesture change parameter, a virtual object corresponding to the user.

2. The method according to claim 1, wherein the gesture change parameter comprises a squat parameter, and
controlling, according to the gesture change parameter, the virtual object corresponding to the user comprises:
   determining, according to the squat parameter, a jump parameter of a jump of the virtual object; and controlling, according to the jump parameter, the jump of the virtual object.

3. The method according to claim 2, wherein the squat parameter comprises at least one of:
elapsed time of a squat, or
an amplitude of the squat.

4. The method according to claim 2, wherein the jump parameter comprises at least one of:
an accumulation time of a jump power;
the jump power;
an accumulation speed of the jump power; or
a jump distance.

5. The method according to claim 1, wherein the first local part is a face of the user, the first key point is a first face key point, and the second key point is a second face key point; and
determining the gesture change parameter according to the first key point and the second key point comprises:
determining a first face box according to the first face key point;
determining a second face box according to the second face key point; and
determining the gesture change parameter according to a relative position between the first face box and the second face box.

6. The method according to claim 5, wherein determining the gesture change parameter according to the relative position between the first face box and the second face box comprises:
in response to determining that a change of position of the first face box relative to the second face box in the-a preset direction exceeds a preset threshold, determining that a gesture of the user in the preset direction changes.

7. The method according to claim 6, wherein in response to determining that the change of position of the first face box relative to the second face box in the preset direction exceeds the preset threshold, determining that the gesture of the user in the preset direction changes, comprises at least one of:
in response to determining that an amount of descending of the first face box compared with the second face box in a vertical direction exceeds a descent threshold, determining that the user squats; or
in response to determining that an amount of rise of the first face box compared with the second face box in the vertical direction exceeds a rise threshold, determining that the user gets up.

8. The method according to claim 1, wherein
in response to determining that the size of the first local part in the preset direction is reduced, determining that the user squats, comprises:
in response to determining that a reduction value of the size is greater than a reduction threshold, determining that the user squats; and
in response to determining that the size of the first local part in the preset direction is increased, determining that the user gets up, comprises:
in response to determining that an increase value of the size is greater than an increase threshold, determining that the user gets up.

9. The method according to claim 1, wherein the first local part is a trunk of the user, the first key point is a first trunk key point, and the second key point is a second trunk key point; and
wherein determining, according to the first key point and the second key point, the size change of the first local part in the preset direction comprises:
determining, based on the first trunk key point, a first trunk size in a predetermined direction;
determining, based on the second trunk key point, a second trunk size in the predetermined direction; and
determining a size change of the trunk according to the first trunk size and the second trunk size.

10. The method according to claim 1, wherein the first local part is a limb of the user, the first key point is a first limb key point, and the second key point is a second limb key point; and
wherein determining, according to the first key point and the second key point, the size change of the first local part in the preset direction comprises:
determining, based on the first limb key point, a first limb size in a predetermined direction;
determining, based on the second limb key point, a second limb size in the predetermined direction; and
determining a size change of the limb according to the first limb size and the second limb size.

11. The method according to claim 1, further comprising:
determining, according to the plurality of images, a second gesture change parameter of a second local part of the user; and
controlling a jump direction of the virtual object according to the second gesture change parameter of the second local part.

12. The method according to claim 11, wherein the second gesture change parameter of the second local part comprises at least one of:
an orientation of a face, or
a stretch direction of an upper limb.

13. The method according to claim 1, further comprising:
displaying an interface containing a body contour box;
detecting whether a first area in the interface corresponding to the user and a second area in the interface corresponding to the body contour box satisfy a preset relative position relationship; and
in response to that the preset relative position relationship is satisfied, performing the operation of acquiring the plurality of images of the user.

14. The method according to claim 1, wherein the plurality of images of the user are captured successively to form a sequence of image frames.

15. An apparatus for controlling a virtual object, comprising:
a processor; and
a memory configured to store instructions which, when being executed by the processor, cause the processor to carry out the following:
acquiring a plurality of images of a user;
detecting, in a first image of the plurality of images, a first key point of a first local part of the user;
detecting, in a second image of the plurality of images, a second key point of the first local part;
determining a gesture change parameter according to the first key point and the second key point, comprising:
determining, according to the first key point and the second key point, a size change of the first local part in a preset direction, and determining the gesture change parameter according to the size change, comprising at least one of:
in response to determining that a size of the first local part in the preset direction is reduced, determining that the user squats; or in response to determining that the size of the first local part in the preset direction is increased, determining that the user gets up; and controlling, according to the gesture change parameter, a virtual object corresponding to the user.

16. The apparatus according to claim 15, wherein the gesture change parameter comprises a squat parameter, and the instructions, when being executed by the processor, cause the processor to carry out the following:

determining, according to the squat parameter, a jump parameter of a jump of the virtual object; and controlling, according to the jump parameter, the jump of the virtual object.

17. The apparatus according to claim 16, wherein the jump parameter comprises at least one of:

an accumulation time of a jump power;

the jump power;

an accumulation speed of the jump power; or a jump distance.

18. The apparatus according to claim 15, wherein the plurality of images of the user are captured successively to form a sequence of image frames.

19. A non-transitory computer-readable storage medium having stored thereon computer programs that, when being executed by a computer, cause the computer to carry out the following:

acquiring a plurality of images of a user;

detecting, in a first image of the plurality of images, a first key point of a first local part of the user;

detecting, in a second image of the plurality of images, a second key point of the first local part;

determining a gesture change parameter according to the first key point and the second key point, comprising:

determining, according to the first key point and the second key point, a size change of the first local part in a preset direction, and determining the gesture change parameter according to the size change, comprising at least one of:

in response to determining that a size of the first local part in the preset direction is reduced, determining that the user squats; or in response to determining that the size of the first local part in the preset direction is increased, determining that the user gets up; and controlling, according to the gesture change parameter, a virtual object corresponding to the user.

20. The non-transitory computer-readable storage medium according to claim 19, wherein the plurality of images of the user are captured successively to form a sequence of image frames.

\* \* \* \* \*